US011555824B2

(12) United States Patent
Hashimoto et al.

(10) Patent No.: US 11,555,824 B2
(45) Date of Patent: Jan. 17, 2023

(54) AUTOMATIC ANALYSIS APPARATUS

(71) Applicant: Hitachi High-Tech Corporation, Tokyo (JP)

(72) Inventors: Ayaka Hashimoto, Tokyo (JP); Kazunori Yamazawa, Tokyo (JP); Takenori Okusa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 391 days.

(21) Appl. No.: 16/649,500

(22) PCT Filed: Nov. 14, 2018

(86) PCT No.: PCT/JP2018/042084
§ 371 (c)(1),
(2) Date: Mar. 20, 2020

(87) PCT Pub. No.: WO2019/146220
PCT Pub. Date: Aug. 1, 2019

(65) Prior Publication Data
US 2020/0233001 A1 Jul. 23, 2020

(30) Foreign Application Priority Data
Jan. 26, 2018 (JP) .............................. JP2018-012056

(51) Int. Cl.
*G01N 35/10* (2006.01)
*G01N 35/00* (2006.01)

(52) U.S. Cl.
CPC ... *G01N 35/1002* (2013.01); *G01N 35/00732* (2013.01)

(58) Field of Classification Search
CPC ......... G01N 35/00732; G01N 35/1002; G01N 2035/00356; G01N 2035/1013;
(Continued)

(56) References Cited

U.S. PATENT DOCUMENTS 6,190,617 B1 * 2/2001 Clark ..................... G01N 21/03
422/562
2005/0123445 A1 * 6/2005 Blecka ............... G01N 35/0099
422/64
(Continued)

FOREIGN PATENT DOCUMENTS

JP 3-39159 U 4/1991
JP 7-83941 A 3/1995
(Continued)

OTHER PUBLICATIONS

International Search Report (PCT/ISA/210) issued in PCT Application No. PCT/JP2018/042084 dated Jan. 29, 2019 with English translation (four (4) pages).
(Continued)

*Primary Examiner* — Shogo Sasaki
(74) *Attorney, Agent, or Firm* — Crowell & Moring LLP (57) ABSTRACT

To provide a high-throughput automatic analysis apparatus at a lower cost. The automatic analysis apparatus includes an incubator which accommodates a plurality of reaction vessels; a specimen dispensing mechanism which dispenses a specimen into each of the plurality of reaction vessels; a mounting unit which mounts a dispensing tip on the specimen dispensing mechanism; a suction unit which sucks a specimen from a specimen vessel containing the specimen by means of the specimen dispensing mechanism having the dispensing mounted thereon; a discharging unit which is provided in the incubator and discharges the specimen from the specimen dispensing mechanism to the reaction vessel; a disposal unit which discards the dispensing tip; a sensor which detects whether the dispensing tip is mounted to the specimen dispensing mechanism; and a control unit which controls the specimen dispensing mechanism. The mounting unit, the suction unit, the discharging unit, and the disposal unit are arranged along a movement path of the specimen
(Continued)

dispensing mechanism. The sensor is arranged so as to be able to detect the dispensing tip at a position sandwiched between any two of the mounting unit, the suction unit, the discharging unit, and the disposal unit.

4 Claims, 10 Drawing Sheets

(58) Field of Classification Search
CPC ....... G01N 35/1011; G01N 2035/0444; G01N 2035/103; B01L 2200/18; B01L 2300/021; B01L 3/02
See application file for complete search history.

(56) References Cited

U.S. PATENT DOCUMENTS

| | | |
|---|---|---|
| 2005/0178795 A1 | 8/2005 | Inoue |
| 2008/0311678 A1* | 12/2008 | Ootani .................. G01N 35/10 436/526 |
| 2009/0117004 A1* | 5/2009 | Fritchie .................. B03C 1/284 422/63 |
| 2012/0115238 A1 | 5/2012 | Akashi et al. |
| 2013/0017535 A1* | 1/2013 | Frey .................. G01N 35/0099 422/65 |
| 2020/0233001 A1* | 7/2020 | Hashimoto ........ G01N 35/1002 |

FOREIGN PATENT DOCUMENTS

| | | |
|---|---|---|
| JP | 3177608 B2 | 6/2001 |
| JP | 2001-330619 A | 11/2001 |
| JP | 2005-201769 A | 7/2005 |
| JP | 2008-89366 A | 4/2008 |
| JP | 2013-44692 A | 3/2013 |
| WO | WO 2011/004653 A1 | 1/2011 |

OTHER PUBLICATIONS

Japanese-language Written Opinion (PCT/ISA/237) issued in PCT Application No. PCT/JP2018/042084 dated Jan. 29, 2019 (five (5) pages).

* cited by examiner

ARRANGEMENT ORDER →

| No. | | | | | | EVALUATION |
|---|---|---|---|---|---|---|
| 1 | A | B | C | D | E | NG |
| 2 | A | B | C | E | D | GD |
| 3 | A | B | D | C | E | NG |
| 4 | A | B | D | E | C | GD |
| 5 | A | B | E | C | D | GD |
| 6 | A | B | E | D | C | GD |
| 7 | A | C | B | D | E | NG |
| 8 | A | C | B | E | D | GD |
| 9 | A | C | D | B | E | NG |
| 10 | A | C | D | E | B | GD |
| 11 | A | C | E | B | D | SP |
| 12 | A | C | E | D | B | SP |
| 13 | A | D | B | C | E | NG |
| 14 | A | D | B | E | C | GD |
| 15 | A | D | C | B | E | NG |
| 16 | A | D | C | E | B | GD |
| 17 | A | D | E | B | C | GD |
| 18 | A | D | E | C | B | GD |
| 19 | A | E | B | C | D | GD |
| 20 | A | E | B | D | C | GD |
| 21 | A | E | C | B | D | GD |
| 22 | A | E | C | D | B | GD |
| 23 | A | E | D | B | C | GD |
| 24 | A | E | D | C | B | GD |
| ⋮ | ⋮ | ⋮ | ⋮ | ⋮ | ⋮ | ⋮ |

[Fig. 10B]

ARRANGEMENT ORDER →

| No. | | | | | | EVALUATION |
|---|---|---|---|---|---|---|
| ⋮ | ⋮ | ⋮ | ⋮ | ⋮ | ⋮ | ⋮ |
| 25 | B | A | C | D | E | NG |
| 26 | B | A | C | E | D | GD |
| 27 | B | A | D | C | E | NG |
| 28 | B | A | D | E | C | GD |
| 29 | B | A | E | C | D | GD |
| 30 | B | A | E | D | C | GD |
| 31 | B | C | A | D | E | NG |
| 32 | B | C | A | E | D | GD |
| 33 | B | C | D | A | E | NG |
| 34 | B | C | E | A | D | GD |
| 35 | B | D | A | C | E | NG |
| 36 | B | D | A | E | C | GD |
| 37 | B | D | C | A | E | NG |
| 38 | B | D | E | A | C | EX |
| 39 | B | E | A | C | D | GD |
| 40 | B | E | A | D | C | GD |
| 41 | B | E | C | A | D | GD |
| 42 | B | E | D | A | C | GD |
| 43 | C | A | B | D | E | NG |
| 44 | C | A | B | E | D | GD |
| 45 | C | A | D | B | E | NG |
| 46 | C | A | E | B | D | EX |
| 47 | C | B | A | D | E | NG |
| 48 | C | B | A | E | D | GD |
| 49 | C | B | D | A | E | NG |
| 50 | C | B | E | A | D | GD |
| 51 | C | D | A | B | E | NG |
| 52 | C | D | B | A | E | NG |
| 53 | C | E | A | B | D | GD |
| 54 | C | E | B | A | D | GD |
| 55 | D | A | B | C | E | NG |
| 56 | D | A | C | B | E | NG |
| 57 | D | B | A | C | E | NG |
| 58 | D | B | C | A | E | NG |
| 59 | D | C | A | B | E | NG |
| 60 | D | C | B | A | E | NG |

AUTOMATIC ANALYSIS APPARATUS

TECHNICAL FIELD

The present invention relates to an automatic analysis apparatus.

BACKGROUND ART

In recent years, an automatic analysis apparatus is increasingly required to provide high processing performance and accurate analysis results. In order to obtain high processing performance, it is necessary to reduce useless operations as much as possible in the automatic analysis apparatus. An automatic analysis apparatus is known which is configured to perform dispensing of a specimen or a reagent by using a disposable dispensing tip in order to prevent abnormality of an analysis result due to contamination of a biological sample or a regent.

The disposable dispensing tip is attached to a dispensing mechanism for each dispensing operation, and is removed from the dispensing mechanism for disposal. Therefore, there is concern over a failure of attaching and/or removing the dispensing tip and a falling of the dispensing tip during the dispensing operation. When an attaching failure occurs, a normal dispensing operation cannot be performed, and when a removing failure occurs, it causes abnormal dispensing and the like due to double mounting of dispensing tips. Further, when the dispensing tip falls, a normal dispensing operation cannot be performed.

Therefore, for example, Patent Literature 1 proposes an automatic analysis apparatus having a configuration that confirms whether or not the dispensing tip is mounted to the dispensing mechanism during the dispensing operation. Patent Literature 1 discloses a configuration in which the dispensing tip is mounted to the dispensing mechanism and a microswitch that is an accessory of the dispensing mechanism detects whether or not the dispensing tip is mounted.

However, when a sensor, a switch, or the like is provided to the dispensing mechanism itself, the structure of the dispensing mechanism is complicated and there is concern over increase of cost, so that this is not preferable. When a sensor is provided outside the dispensing mechanism, the cost of the dispensing mechanism is suppressed. However, when there is only one sensor, the dispensing mechanism is required to move to a sensor position many times for confirming the presence or absence of mounting of the dispensing tip, so that processing performance is affected and the throughput is degraded. When a plurality of sensors are provided, useless movement to the sensor position is not required. However, this is not preferable in cost.

CITATION LIST

Patent Literature

Patent Literature 1: Japanese Patent No. 3177608

SUMMARY OF INVENTION

Technical Problem

An object of the present invention is to provide a low-cost and high-throughput automatic analysis apparatus.

Solution to Problem

To solve the above problem, an automatic analysis apparatus according to a first aspect of the present invention includes an incubator which accommodates a plurality of reaction vessels, a specimen dispensing mechanism which dispenses a specimen into each of the plurality of reaction vessels, a mounting unit which mounts a dispensing tip on the specimen dispensing mechanism, a suction unit which sucks a specimen from a specimen vessel containing the specimen by means of the specimen dispensing mechanism having the dispensing tip mounted thereon, a discharging unit which is provided in the incubator and discharges the specimen from the specimen dispensing mechanism to the reaction vessel, a disposal unit which discards the dispensing tip, a sensor which detects whether the dispensing tip is mounted to the specimen dispensing mechanism, and a control unit which controls the specimen dispensing mechanism. The mounting unit, the suction unit, the discharging unit, and the disposal unit are arranged along a movement path of the specimen dispensing mechanism. The sensor is arranged so as to be able to detect the dispensing tip at a position sandwiched between any two of the mounting unit, the suction unit, the discharging unit, and the disposal unit.

An automatic analysis apparatus according to a second aspect of the present invention includes an incubator which accommodates a plurality of reaction vessels, a specimen dispensing mechanism which dispenses a specimen into each of the plurality of reaction vessels, a mounting unit which mounts a dispensing tip on the specimen dispensing mechanism, a suction unit which sucks a specimen from a specimen vessel containing the specimen by means of the specimen dispensing mechanism having the dispensing tip mounted thereon, a discharging unit which is provided in the incubator and discharges the specimen from the specimen dispensing mechanism to the reaction vessel, a disposal unit which discards the dispensing tip, a sensor which detects whether the dispensing tip is mounted to the specimen dispensing mechanism, and a control unit which controls the specimen dispensing mechanism. The mounting unit, the suction unit, the discharging unit, and the disposal unit are arranged along a straight line. The specimen dispensing mechanism is configured to be capable of moving the dispensing tip along the straight line. The sensor is configured to be capable of detecting whether there is the dispensing tip on the straight line or not.

Effect of the Invention

According to the present invention, it is possible to provide a low-cost and high-throughput automatic analysis apparatus.

BRIEF DESCRIPTION OF DRAWINGS

FIG. 1 is an overall schematic diagram of an automatic analysis apparatus 100 according to a first embodiment.

DESCRIPTION OF EMBODIMENTS

Hereinafter, embodiments will be described with reference to the accompanying drawings. In the accompanying drawings, elements having the same functions may be represented by the same numbers or corresponding numbers. Although the accompanying drawings show embodiments and implementation examples based on the principle of the present disclosure, these are to understand the present disclosure and are never used to restrictively interpret the present disclosure. The description of the present specification is only a typical example and does not limit in any sense the claims or application examples of the present disclosure.

The embodiments are sufficiently described in detail so that a person skilled in the art can carry out the present disclosure. However, other implementations and forms are possible, and it is necessary to understand that change of configurations/structures and replacement of various elements are possible without departing from the scope and spirit of the technical idea of the present disclosure. Therefore, the description below shall not be construed to be limited to the embodiments.

First Embodiment

FIG. 1 is an overall schematic diagram of an automatic analysis apparatus 100 according to a first embodiment. The automatic analysis apparatus 100 includes a control unit 102, an input unit 103, and a display unit 104. The control unit 102 is a computer in charge of the entire operation of the automatic analysis apparatus 100 including a specimen dispensing mechanism 107 described later. The input unit 103 is an input apparatus, for example, a keyboard and a mouse, for inputting various operation instructions and various data. The display unit 104 is, for example, a liquid crystal display, a printer, or the like and is a device that can display various analysis results, operating states of apparatuses, presence or absence of occurrence of abnormality, and the like.

The automatic analysis apparatus 100 further includes a specimen vessel 105, a specimen vessel rack 106, the specimen dispensing mechanism 107, a reagent dispensing mechanism 108, a reagent vessel 109, a reaction vessel and dispensing tip accommodating unit 110, and an incubator 111. The specimen vessel 105 is a vessel that stores a specimen that is an object to be inspected. The specimen vessel rack 106 is a holding unit for holding the specimen vessel 105. The specimen vessel rack 106 is transported to a suction unit 106S described later by a transport mechanism not shown in the drawings.

The specimen dispensing mechanism 107 is configured to be capable of holding a dispensing tip CP and sucking the specimen from the specimen vessel 105 and is also configured to be capable of discharging the sucked specimen to a reaction vessel RC. The reagent dispensing mechanism 108 is configured to be capable of sucking a reagent from the reagent vessel 109 and discharging the sucked reagent to the reaction vessel RC. As shown in the lower right of FIG. 1 separated from the overall schematic diagram, the specimen dispensing mechanism 107 includes an arm 1071 that can rotate around a rotation shaft 1070 and a dispensing nozzle 1072 which is attached to a tip of the arm 1071 and configured to be capable of holding the dispensing tip CP. Although not shown in the drawings, the reagent dispensing mechanism 108 also includes an arm that can rotate around a rotation shaft and a nozzle attached to a tip of the arm.

The reaction vessel and dispensing tip accommodating unit 110 is an accommodating unit that accommodates the reaction vessels RC and the dispensing tips CP. The reaction vessel RC is appropriately transported to the incubator 111 by a transport mechanism not shown in the drawings. The dispensing tip CP is appropriately transported to mounting unit 114 described later by a transport mechanism not shown in the drawings and thereafter attached to the specimen dispensing mechanism 107 in the mounting unit 114. The incubator 111 has a temperature control mechanism and has a role to promote a reaction between the specimen and the reagent in the reaction vessel RC.

The automatic analysis apparatus 100 further includes a sensor 112, a disposal unit 113, and a mounting unit 114. The sensor 112 is a detector for detecting whether or not the dispensing tip CP is attached to (removed from) the dispensing nozzle 1072 of the specimen dispensing mechanism 107 as described later. Although a method of the sensor 112 is not limited to a specific method, as an example, an optical sensor can be used as the sensor 112. However, the sensor 112 is not limited to an optical sensor, and a detection principle and the like of the sensor 112 do not matter as long as the sensor 112 can detect the presence of the dispensing tip CP. As an example, a transmission type photosensor or a reflection type photosensor can be employed as the optical sensor.

The disposal unit 113 is a unit that removes a used dispensing tip CP from the specimen dispensing mechanism 107 and discards the dispensing tip CP after a specimen is injected into the reaction vessel RC. The mounting unit 114 is a mechanism for mounting an unused dispensing tip CP on the dispensing nozzle 1072 of the specimen dispensing mechanism 107. The mounting unit 114 can have a system where the dispensing tip CP is pressed against the dispensing nozzle 1072 and the dispensing tip CP is crimped to the dispensing nozzle 1072. However, the system does not matter as long as the dispensing tip CP is attached to the dispensing nozzle 1072.

Next, a positional relationship between a movement path Rm of the specimen dispensing mechanism 107 and other constituent elements will be described with reference to FIG. 2.

As described above, the specimen dispensing mechanism 107 includes the arm 1071 that can rotate around the rotation shaft 1070 and the dispensing nozzle 1072 that is attached to the arm 1071. The specimen dispensing mechanism 107 is configured to be capable of being moved along the arc-like movement path Rm by the rotation of the arm 1071. The movement path Rm is not limited to a curved line and may be a straight line. The curved line is not limited to an arc curve and may be, for example, an elliptic arc curve, a cycloidal curve, an asteroid curve, a spiral curve, or the like.

The suction unit 106S in the specimen vessel rack 106, the disposal unit 113, a discharging unit 111P in the incubator 111, and the mounting unit 114 are arranged along the movement path Rm. The suction unit 106S, the disposal unit 113, a discharging unit 111P, and the mounting unit 114 are arranged along the movement path Rm, and thereby attachment, suction, discharge, and disposal operations of the dispensing tip CP are performed by the movement of the specimen dispensing mechanism 107 along the movement path Rm.

A certain degree of freedom is allowed for the arrangement of the suction unit 106S, the disposal unit 113, a discharging unit 111P, the mounting unit 114, and the sensor 112 as described later. However, the sensor 112 is arranged so that the optical sensor 112 can detect the dispensing tip CP in a position between any two of the mounting unit 114, the suction unit 106S, the discharging unit 111P, and the disposal unit 113 in the movement path Rm. In other words, the detection position of the optical sensor 112 located in a position farther than an end portion (inside) of the movement path Rm when viewed from at least one of the mounting unit 114, the suction unit 106S, the discharging unit 111P, and the disposal unit 113. By employing such an arrangement, it is possible to eliminate useless movement of the specimen dispensing mechanism 107, and as a result, the throughput of the automatic analysis apparatus can be improved.

Figure 2:
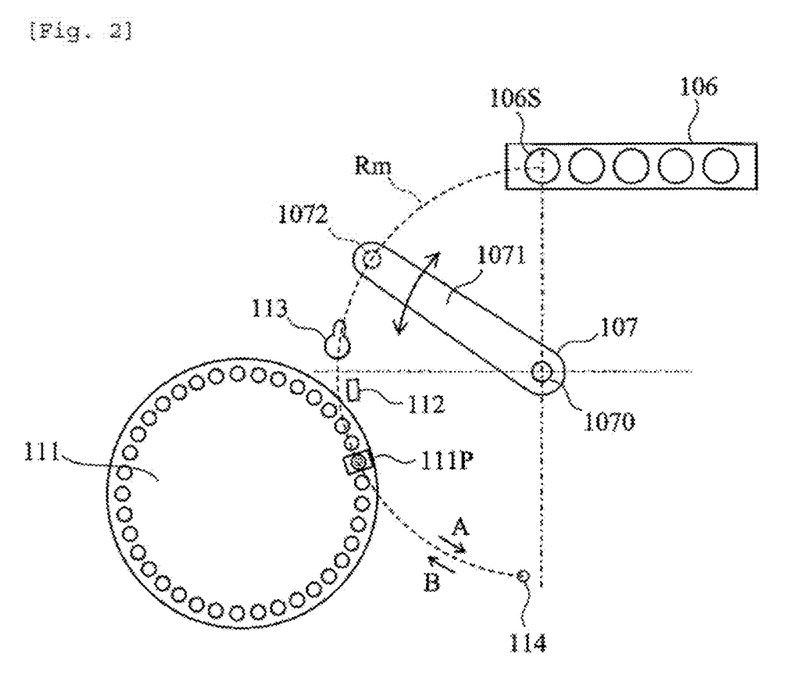
FIG. 2 is a view illustrating a positional relationship between a movement path Rm of a specimen dispensing mechanism 107 and other constituent elements according to the first embodiment.

In the example in FIG. 2, the detection position of the optical sensor 112 is arranged in the center of the movement path Rm, the discharging unit 111P and the mounting unit 114 are arranged on one side of the movement path Rm, and the disposal unit 113 and the suction unit 106S are arranged on the other side of the movement path Rm. In other words, the sensor 112 is arranged to be capable of detecting the dispensing tip CP in a position between the disposal unit 113 and the discharging unit 111P. This arrangement is particularly preferable from the viewpoint of minimizing useless movement of the specimen dispensing mechanism 107. As shown in the flowchart in FIG. 3, a specimen dispensing operation is performed in the order described below.
(A) Mounting of the dispensing tip CP in the mounting unit 114 (step S1)
(B) Suction of specimen in the suction unit 106S (step S3)
(C) Discharge of specimen in the discharging unit 111P (step S5)
(D) Disposal of specimen in the disposal unit 113 (step S7)
In each of the operations of steps S1, S3, S5, and S7, the sensor 112 detects (checks) the presence or absence of the dispensing tip CP on the dispensing nozzle 1072 (steps S2, S4, S6, and S8).

In the arrangement of FIG. 2, when viewed from the detection position of the sensor 112, the mounting unit 114 and the discharging unit 111P are arranged on one side of the movement path Rm and the suction unit 106S and the disposal unit 113 are arranged on the other side of the movement path Rm. In the case of this arrangement, in any case of a movement from (A) to (B), a movement from (B) to (C), and a movement from (C) to (D), it is possible to pass through the detection position of the sensor 112 (without detouring the detection position of the sensor 112) during the movement. Therefore, it is possible to minimize the movement of the specimen dispensing mechanism 107 for detecting the presence or absence of the dispensing tip CP, and the throughput can be improved accordingly.

Further, in the example in FIG. 2, the mounting unit 114 is arranged closer to (on a side closer to) the end portion of the movement path Rm than the suction unit 106S, the discharging unit 111P, and the disposal unit 113. As described above, the mounting unit 114 is a unit where an unused dispensing tip CP is arranged. The mounting unit 114 is located close to the end portion of the movement path Rm, so that in the operations of the above (A) to (D), the (used) dispensing tip CP that has sucked a specimen does not pass through above the mounting unit 114. Therefore, it is possible to avoid contamination of the unused dispensing tip CP arranged in the mounting unit 114.

An initial position of the specimen dispensing mechanism 107 (the dispensing nozzle 1072) may be an arbitrary position. However, a position between the sensor 112 and the suction unit 106S is suitable for the initial position. Alternatively, a standby position where the specimen dispensing mechanism 107 (the dispensing nozzle 1072) stands by during a time other than a time of the specimen dispensing operation can be a position between the sensor 112 and the suction unit 106S in the same manner as the initial position. By doing so, it is possible to detect the presence or absence of mounting of the dispensing tip CP on the dispensing nozzle 1072 before the dispensing nozzle 1072 moves from the initial position to the mounting unit 114 and the dispensing tip CP is mounted on the dispensing nozzle 1072.

Next, the specimen dispensing operation in the automatic analysis apparatus in FIG. 2 according to the flowchart in FIG. 3 will be described in detail.

When a specimen dispensing instruction is inputted from the input unit 103 or the like through the control unit 102, by a control signal from the control unit 102, the dispensing nozzle 1072 of the specimen dispensing mechanism 107 starts moving from the initial position in a direction of an arrow A along the movement path Rm. The dispensing nozzle 1072 of the specimen dispensing mechanism 107 reaches the mounting unit 114 and is mounted with the dispensing tip CP (step S1).

Thereafter, the dispensing nozzle 1072 moves in the opposite direction (direction of an arrow B) on the movement path Rm, passes through the discharging unit 111P, the detection position of the sensor 112, and the disposal unit 113, reaches the suction unit 106S, and sucks a specimen from the specimen vessel 105 in the suction unit 106S (step S3). During a transitional period from step S1 to step S3, when the dispensing nozzle 1072 passes through the detection position of the sensor 112, the sensor 112 detects the presence or absence of mounting of the dispensing tip CP at the tip of the dispensing nozzle 1072 (step S2). When the mounting of the dispensing tip CP is detected, it is determined that the dispensing operation is normally performed, and the dispensing operation is continued. When the dispensing tip CP is not detected, it is determined that an abnormality occurs in the dispensing operation (the mounting of the dispensing tip CP fails), the operation of the specimen dispensing mechanism 107 is stopped, and an abnormality notification is displayed on the display unit 104.

After sucking the specimen in the suction unit 106S, the specimen dispensing mechanism 107 returns again on the movement path Rm in the opposite direction (the direction of the arrow A), passes through the disposal unit 113 and the detection position of the sensor 112, and reaches the discharging unit 111P of the incubator 111. In the discharging unit 111P, the specimen dispensing mechanism 107 discharges the specimen into the reaction vessel RC (step S5). During a transitional period from step S3 to step S5, when the dispensing nozzle 1072 passes through the detection position of the sensor 112, the presence or absence of mounting of the dispensing tip CP at the tip of the dispensing nozzle 1072 is detected (step S4). When the mounting of the dispensing tip CP is detected, it is determined that the dispensing operation is normally performed, and the dispensing operation is continued. When the dispensing tip CP is not detected, it is determined that an abnormality occurs in the dispensing operation, the operation of the specimen dispensing mechanism 107 is stopped, and an abnormality notification is displayed on the display unit 104.

After discharging the specimen in the discharging unit 111P, the dispensing nozzle 1072 of the specimen dispensing mechanism 107 moves again on the movement path Rm in the direction of the arrow B, passes through the sensor 112, and then reaches the disposal unit 113. In the disposal unit 113, the dispensing tip CP is removed from the dispensing nozzle 1072 and the dispensing tip CP is discarded (step S7). During a transitional period from step S5 to step S7, when the dispensing nozzle 1072 passes through the detection position of the sensor 112, the presence or absence of mounting of the dispensing tip CP at the tip of the dispensing nozzle 1072 is detected (step S6). When the mounting of the dispensing tip CP is detected, it is determined that the dispensing operation is normally performed, and the dispensing operation is continued. When the dispensing tip CP is not detected, it is determined that an abnormality occurs in the dispensing operation, the operation of the specimen dispensing mechanism 107 is stopped, and an abnormality notification is displayed on the display unit 104.

When the disposal of the dispensing tip CP in the disposal unit 113 is completed, the specimen dispensing mechanism 107 returns to the standby position described above and stands by until the next dispensing instruction is received. Before transiting to this standby state, the specimen dispensing mechanism 107 passes through the detection position of the sensor 112, so that the sensor 112 detects the presence or absence of the dispensing tip CP at the tip of the dispensing nozzle 1072. When it is determined that the dispensing tip CP is absent, it is determined that the disposal of the dispensing tip CP is completed, and the dispensing operation is continued. When it is determined that the dispensing tip CP remains at the tip of the dispensing nozzle 1072, it is determined that an abnormality occurs in the dispensing operation, the operation of the specimen dispensing mechanism 107 is stopped, and an abnormality notification is displayed on the display unit 104.

When a start instruction of the next specimen dispensing operation is received, the specimen dispensing mechanism 107 moves the dispensing nozzle 1072 from the standby position to the mounting unit 114 through the sensor 112 and the discharging unit 111P. Hereinafter, the same procedure as described above will be repeated.

In this way, in the apparatus in FIG. 2, the mounting unit 114, the suction unit 106S, the discharging unit 111P, and the disposal unit 113 are arranged as described above, so that the specimen dispensing mechanism 107 can pass through the detection position of the sensor 112 without detouring the detection position of the sensor 112 during a transition between steps S1, S3, S5, and S7 described above. Therefore, it is possible to improve the throughput of the automatic analysis apparatus. The sensor 112 is provided outside the specimen dispensing mechanism 107, and only one sensor 112 is provided, so that it is possible to reduce the cost. When the dispensing nozzle 1072 passes through the sensor 112, if the sensor 112 cannot detect the dispensing tip CP even when the dispensing tip CP should have been mounted on the dispensing nozzle 1072 or if the sensor 112 detects mounting of the dispensing tip CP even when the dispensing tip CP should not have been mounted on the dispensing nozzle 1072, It is possible to determine that an abnormality occurs, cause the display unit 104 to notify occurrence of abnormality, and stop the specimen dispensing operation.

Second Embodiment

Figure 4:
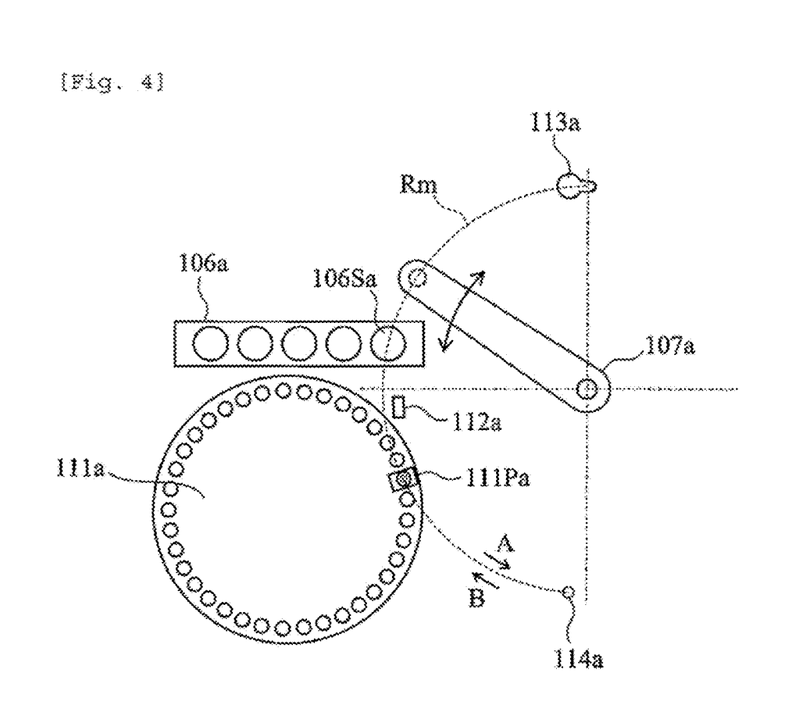
FIG. 4 is a view illustrating a positional relationship between a movement path Rm of a specimen dispensing mechanism 107a and other constituent elements according to a second embodiment.

Next, the second embodiment of the present invention will be described with reference to FIG. 4. FIG. 4 is a schematic diagram showing an arrangement of a discharging unit 111Pa, a disposal unit 113a, a suction unit 106Sa, a mounting unit 114a, and a sensor 112a in the automatic analysis apparatus 100 according to the second embodiment. The entire configuration of the apparatus is substantially the same as that in FIG. 1 except for the arrangement of the discharging unit 111Pa, the disposal unit 113a, the suction unit 106Sa, the mounting unit 114a, and the sensor 112a, so that redundant description will be omitted. In FIG. 4, the discharging unit 111Pa, the disposal unit 113a, the suction unit 106Sa, the mounting unit 114a, and the sensor 112a respectively correspond to the discharging unit 111P, the disposal unit 113, the suction unit 106S, the mounting unit 114, and the sensor 112 of the first embodiment (FIG. 2), so that redundant description will be omitted.

In the second embodiment (FIG. 4), the detection position of the optical sensor 112a is arranged in the center of the movement path Rm, and this is the same as in the first embodiment (FIG. 2). When viewed from the detection position of the sensor 112a, the discharging unit 111Pa and the mounting unit 114a are arranged on one side of the movement path Rm, and the disposal unit 113a and the suction unit 106Sa are arranged on the other side of the movement path Rm. This is also the same as in the first embodiment. However, in FIG. 4, the positional relationship between the disposal unit 113a and the suction unit 106Sa is reverse to that in FIG. 2. Specifically, the disposal unit 113a is arranged close to an end portion of the movement path Rm, and the suction unit 106Sa is arranged more inside of the movement path Rm than the disposal unit 113a. Also in the arrangement of FIG. 4, when the specimen dispensing operation (FIG. 3) is performed, it is possible to eliminate useless movement of the specimen dispensing mechanism 107 and improve the throughput of the automatic analysis apparatus in the same manner as in FIG. 2 (the first embodiment).

The details of the specimen dispensing operation in the second embodiment are substantially the same as that in the first embodiment, so that redundant description will be omitted. A moving distance of the specimen dispensing mechanism 107 when transiting from step S1 to step S3 in the second embodiment is shorter than that in the first embodiment. On the other hand, a moving distance of the specimen dispensing mechanism 107 when transiting from step S5 to step S7 in the second embodiment is longer than that in the first embodiment. However, as a whole, the throughput of the apparatus of the second embodiment is substantially the same as that of the first embodiment.

Third Embodiment

Figure 5:
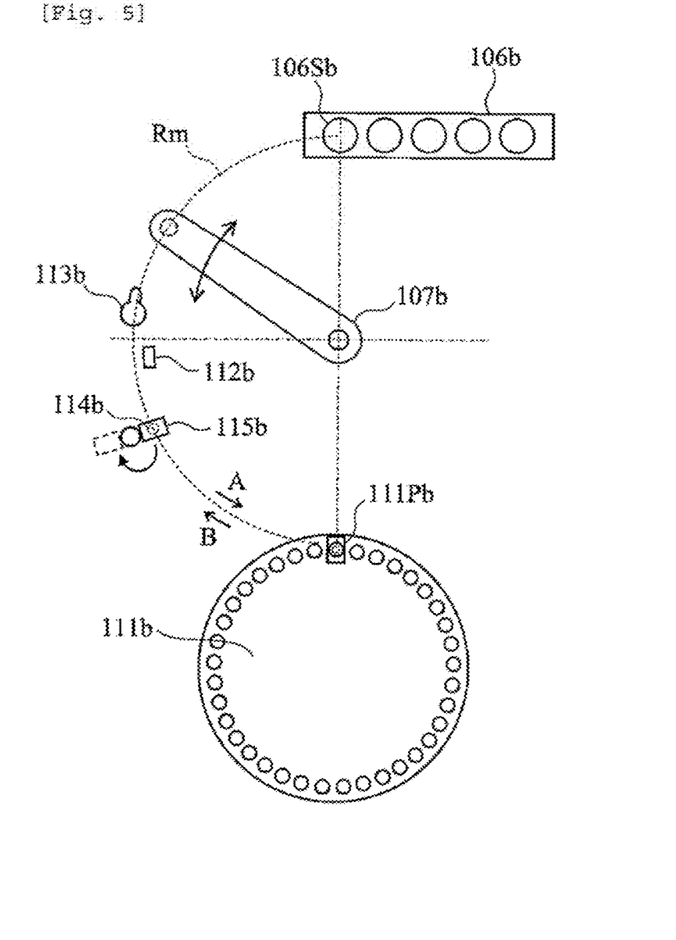
FIG. 5 is a view illustrating a positional relationship between a movement path Rm of a specimen dispensing mechanism 107b and other constituent elements according to a third embodiment.

Next, the third embodiment of the present invention will be described with reference to FIG. 5. FIG. 5 is a schematic diagram showing an arrangement of a discharging unit 111Pb, a disposal unit 113b, a suction unit 106Sb, a mounting unit 114b, and a sensor 112b in the automatic analysis apparatus 100 according to the third embodiment. The entire configuration of the apparatus is substantially the same as that in FIG. 1 except for the arrangement of the discharging unit 111Pb, the disposal unit 113b, the suction unit 106Sb, the mounting unit 114b, and the sensor 112b, so that redundant description will be omitted. In FIG. 5, the discharging unit 111Pb, the disposal unit 113b, the suction unit 106Sb, the mounting unit 114b, and the sensor 112b respectively correspond to the discharging unit 111P, the disposal unit 113, the suction unit 106S, the mounting unit 114, and the sensor 112 of the first embodiment (FIG. 2), so that redundant description will be omitted.

In the third embodiment (FIG. 5), the detection position of the optical sensor 112b is arranged in the center of the movement path Rm, and this is the same as in the first and second embodiments (FIGS. 2 and 4). When viewed from the detection position of the sensor 112b, the discharging unit 111Pb and the mounting unit 114b are arranged on one side of the movement path Rm, and the disposal unit 113b and the suction unit 106Sb are arranged on the other side of the movement path Rm. This is also the same as in the first embodiment.

However, in FIG. 5, the positional relationship between the mounting unit 114b and the discharging unit 111Pb is reverse to that in FIGS. 2 and 4. Specifically, the mounting unit 114b is arranged in a position farther from an end portion of the movement path Rm than the discharging unit 111Pb, and this is different from the examples in FIGS. 2 and 4. When the mounting unit 114b is located more inside of the movement path Rm than the discharging unit 111Pb, the dispensing tip CP that has sucked a specimen can pass through above the mounting unit 114b in the middle of the specimen dispensing operation. In this case, it can be considered that an unused dispensing tip CP mounted in the mounting unit 114b is contaminated by the specimen and an accurate inspection is hindered.

Therefore, in the third embodiment, this problem is solved by separately providing a mounting unit cover 115b that covers the mounting unit 114b. As described later, during a mounting operation, the mounting unit cover 115b is retreated from the mounting unit 114b, and otherwise, the mounting unit cover 115b is arranged so as to cover the mounting unit 114b.

Figure 6:
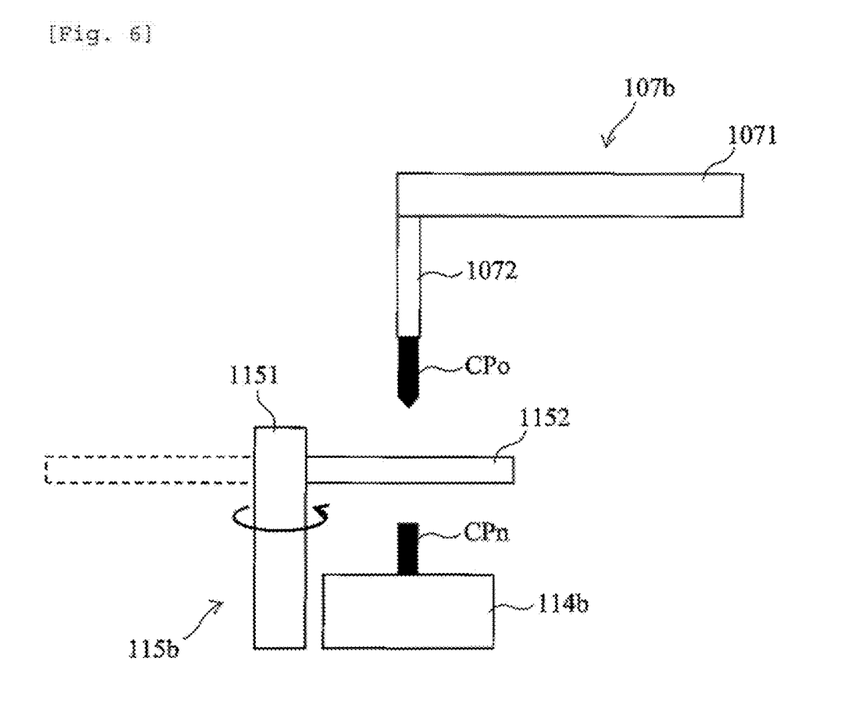
FIG. 6 is a schematic cross-sectional view illustrating a structure and an operation of a mounting unit cover 115b according to the third embodiment.

As shown in FIG. 6, the mounting unit cover 115b includes a rotation shaft 1151 and a shielding plate 1152 that rotates around the rotation shaft 1151. The rotation shaft 1151 is arranged close to the mounting unit 114b and is configured to be able to be rotated by a motor not shown in the drawings. The shielding plate 1152 is set to a shielding position (solid line in FIG. 6) that covers the mounting unit 114b or a retreat position (dashed line in FIG. 6) that does not cover the mounting unit 114b by the rotation of the rotation shaft 1151. A used dispensing tip CPo after the specimen dispensing mechanism 107b sucks a specimen is held at the tip of the dispensing nozzle 1072, and when such a used dispensing tip CPo passes through above the mounting unit 114b, the shielding plate 1152 is set to the shielding position described above. Thereby, it is possible to prevent the specimen from leaking and falling from the used dispensing tip CPo to the mounting unit 114b and to prevent an unused dispensing tip CPn from being contaminated. In the example of FIG. 6, the mounting unit cover 115b has a structure that rotates around the rotation shaft, however, it is not limited thereto and the shielding plate 1152 may be slid by being driven by a solenoid or the like.

Next, the specimen dispensing operation in the automatic analysis apparatus in FIG. 5 will be described in detail with reference to the flowchart in FIG. 3. Here, as an example, it is assumed that the specimen dispensing mechanism 107b is located in the initial position or the standby position between the disposal unit 113b and the suction unit 106Sb and the next specimen dispensing instruction is waited.

When the specimen dispensing instruction is inputted, the dispensing nozzle 1072 of the specimen dispensing mechanism 107b starts moving from the initial position or the standby position in a direction of an arrow A along the movement path Rm. The mounting unit cover 115b receives the specimen dispensing instruction and moves to the retreat position. Instead that the mounting unit cover 115b receives the specimen dispensing instruction and moves to the retreat position, it is possible to define that when the specimen dispensing mechanism 107b is located in the initial position or the standby position, the specimen dispensing mechanism 107b has been moved to the retreat position.

When the dispensing nozzle 1072 of the specimen dispensing mechanism 107b reaches the mounting unit 114b, and the dispensing tip CP is mounted on the dispensing nozzle 1072 (step S1).

Thereafter, the dispensing nozzle 1072 moves in the opposite direction (direction of an arrow B) on the movement path Rm, passes through the detection position of the sensor 112b and the disposal unit 113b, reaches the suction unit 106Sb, and sucks a specimen from the specimen vessel 105 in the suction unit 106Sb (step S3). During a transitional period from step S1 to step S3, when the dispensing nozzle 1072 passes through the detection position of the sensor 112b, the sensor 112b detects the presence or absence of mounting of the dispensing tip CP at the tip of the dispensing nozzle 1072 (step S2). When the mounting of the dispensing tip CP is detected, it is determined that the dispensing operation is normally performed, and the dispensing operation is continued. When the dispensing tip CP is not detected, it is determined that an abnormality occurs in the dispensing operation, the operation of the specimen dispensing mechanism 107b is stopped, and an abnormality notification is displayed on the display unit 104.

After step S1, the mounting unit cover 115b moves to the shielding position described above at any timing until a time point when the specimen dispensing mechanism 107b passes through the mounting unit 114b.

After sucking the specimen in the suction unit 106Sb, the specimen dispensing mechanism 107b returns again on the movement path Rm in the opposite direction (the direction of the arrow A), passes through the disposal unit 113b, the detection position of the sensor 112b, and above the mounting unit 114b shielded by the mounting unit cover 115b, and reaches the discharging unit 111Pb of the incubator 111b. Although the used dispensing tip CPo passes through above the mounting unit 114b, the mounting unit 114b is shielded by the mounting unit cover 115b. Therefore, the unused dispensing tip CPn is prevented from being contaminated.

In the discharging unit 111Pb, the specimen dispensing mechanism 107b discharges the specimen into the reaction vessel RC (step S5). During a transitional period from step S3 to step S5, when the dispensing nozzle 1072 passes through the detection position of the sensor 112b, the presence or absence of mounting of the dispensing tip CP at the tip of the dispensing nozzle 1072 is detected (step S4). When the mounting of the dispensing tip CP is detected, it is determined that the dispensing operation is normally performed, and the dispensing operation is continued. When the dispensing tip CP is not detected, it is determined that an abnormality occurs in the dispensing operation, the operation of the specimen dispensing mechanism 107b is stopped, and an abnormality notification is displayed on the display unit 104.

After discharging the specimen in the discharging unit 111Pb, the dispensing nozzle 1072 of the specimen dispensing mechanism 107b moves again on the movement path Rm in the direction of the arrow B, passes through the mounting unit 114b and the sensor 112b, and then reaches the disposal unit 113b. Also in this stage, it is preferable that the mounting unit 114b is covered by the mounting unit cover 115b. In the disposal unit 113b, the dispensing tip CP is removed from the dispensing nozzle 1072 and the dispensing tip CP is discarded (step S7). During a transitional period from step S5 to step S7, when the dispensing nozzle 1072 passes through the detection position of the sensor 112b, the presence or absence of mounting of the dispensing tip CP at the tip of the dispensing nozzle 1072 is detected (step S6). When the mounting of the dispensing tip CP is detected, it is determined that the dispensing operation is normally performed, and the dispensing operation is continued. When the dispensing tip CP is not detected, it is determined that an abnormality occurs in the dispensing operation, the operation of the specimen dispensing mechanism 107b is stopped, and an abnormality notification is displayed on the display unit 104. The operation after the dispensing tip CP has been discarded in the disposal unit 113b is substantially the same as that in the embodiments described above.

As described above, also in the third embodiment, the same effect as that of the embodiments described above can be obtained. In the third embodiment, although the mounting unit 114b is located in the middle of the movement path Rm, it is possible to avoid contamination of the mounting unit 114b because the mounting unit cover 115b is provided.

Fourth Embodiment

Figure 7:
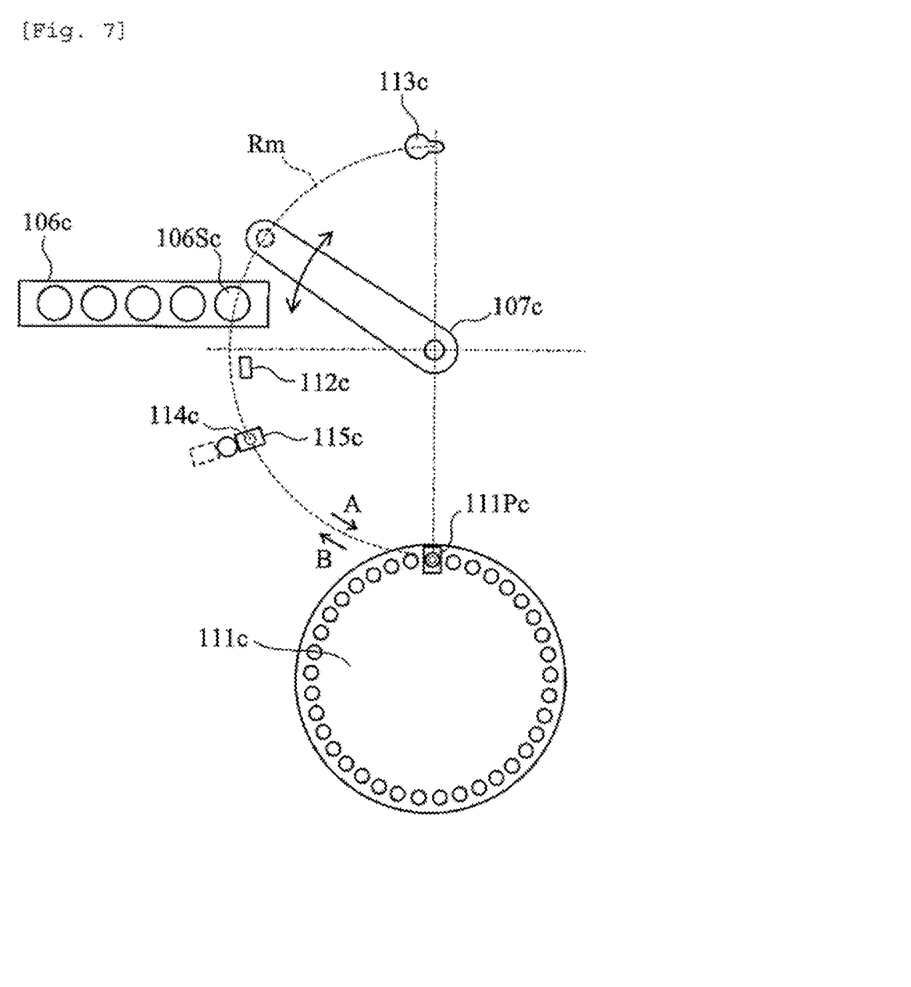
FIG. 7 is a view illustrating a positional relationship between a movement path Rm of a specimen dispensing mechanism 107c and other constituent elements according to a fourth embodiment.

Next, the fourth embodiment of the present invention will be described with reference to FIG. 7. FIG. 7 is a schematic diagram showing an arrangement of a discharging unit 111Pc, a disposal unit 113c, a suction unit 106Sc, a mounting unit 114c, and a sensor 112c in the automatic analysis apparatus 100 according to the fourth embodiment. The entire configuration of the apparatus is substantially the same as that in FIG. 1 except for the arrangement of the discharging unit 111Pc, the disposal unit 113c, the suction unit 106Sc, the mounting unit 114c, and the sensor 112c, so that redundant description will be omitted. In FIG. 7, the discharging unit 111Pc, the disposal unit 113c, the suction unit 106Sc, the mounting unit 114c, and the sensor 112c respectively correspond to the discharging unit 111P, the disposal unit 113, the suction unit 106S, the mounting unit 114, and the sensor 112 of the first embodiment (FIG. 2), so that redundant description will be omitted.

In the fourth embodiment (FIG. 7), the detection position of the optical sensor 112c is arranged in the center of the movement path Rm, and this is the same as in the first to the third embodiments. When viewed from the detection position of the sensor 112c, the discharging unit 111Pc and the mounting unit 114c are arranged on one side of the movement path Rm, and the disposal unit 113c and the suction unit 106Sc are arranged on the other side of the movement path Rm. This is also the same as in the first to the third embodiments.

However, in the fourth embodiment (FIG. 7), in the same manner as in the third embodiment (FIG. 5), the mounting unit 114b is arranged in a position farther from an end portion of the movement path Rm than the discharging unit 111Pb. Therefore, a mounting unit cover 115c that covers the mounting unit 114c is provided. The mounting unit cover 115c may be the same as the mounting unit cover 115b of the third embodiment.

In the same manner as in the second embodiment, the disposal unit 113c is arranged at an end portion of the movement path Rm, and the suction unit 106Sc is arranged inside of the movement path Rm.

Also in the fourth embodiment, the same effect as that of the embodiments described above can be obtained. In the fourth embodiment, although the mounting unit 114c is located in the middle of the movement path Rm in the same manner as in the third embodiment, it is possible to avoid contamination of the unused dispensing tip CPn of the mounting unit 114c because the mounting unit cover 115c is provided.

In the first to the fourth embodiments described above, the sensor is located at the center of the movement path Rm, the mounting unit (114 to 114c) and the discharging unit (111P to 111Pc) are located on one side of the movement path Rm, and the suction unit (106S to 106Sc) and the disposal unit (113 to 113c) are located on the other side of the movement path Rm. The configurations of these embodiments can minimize useless movement of the specimen dispensing mechanism. However, the present invention is not limited to the first to the fourth embodiments. The arrangement of the mounting unit, the suction unit, the discharging unit, the disposal unit, and the sensor can be variously changed.

Fifth Embodiment

Figure 8:
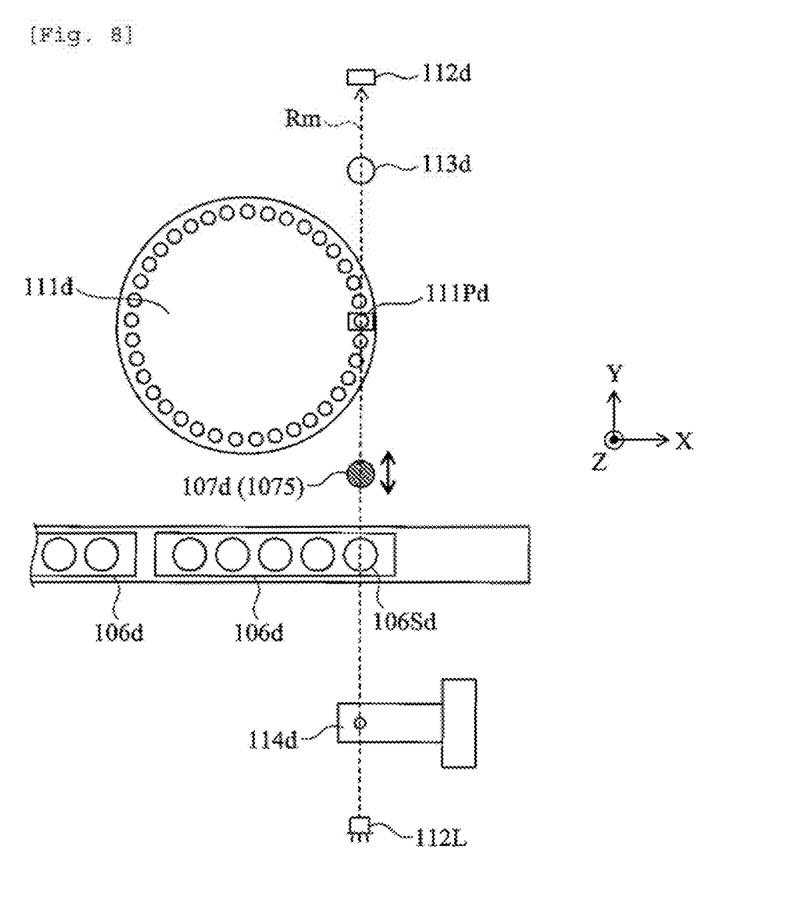
FIG. 8 is a schematic plan view showing an arrangement of a discharging unit 111Pd, a disposal unit 113d, a suction unit 106Sd, a mounting unit 114d, and a sensor 112d according to a fifth embodiment.
Figure 9:
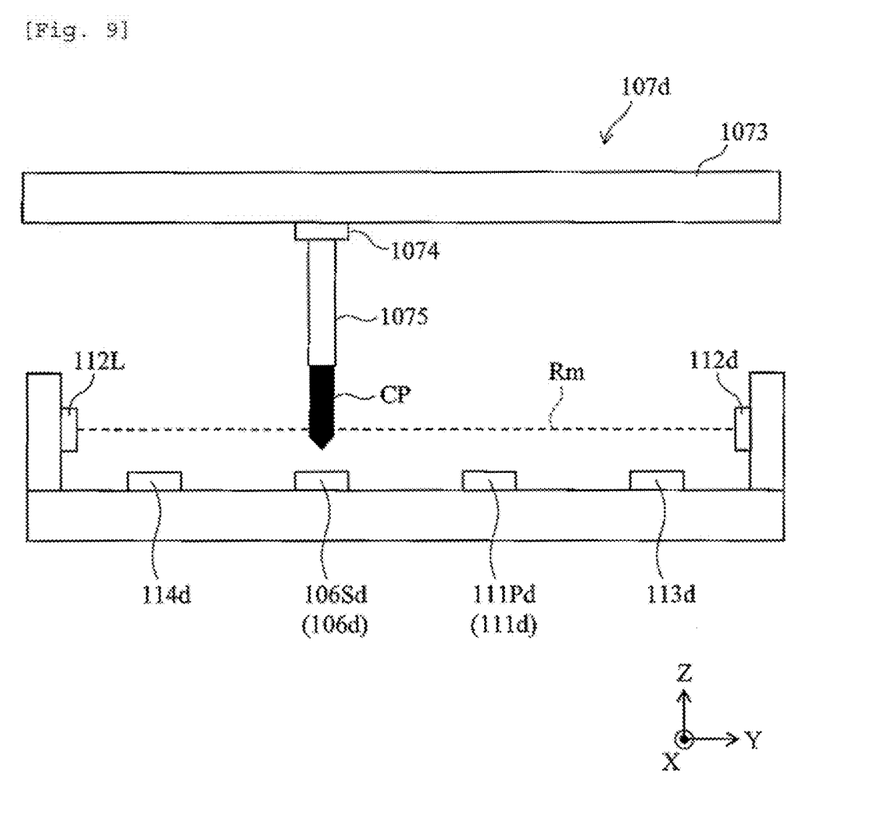
FIG. 9 is a schematic cross-sectional view along a movement path Rm according to the fifth embodiment.

Next, the fifth embodiment of the present invention will be described with reference to FIGS. 8 and 9. FIG. 8 is a schematic diagram showing an arrangement of a discharging unit 111Pd, a disposal unit 113d, a suction unit 106Sd, a mounting unit 114d, and a sensor 112d in the automatic analysis apparatus 100 according to the fifth embodiment. The entire configuration of the apparatus is substantially the same as that in FIG. 1 except for the arrangement of the discharging unit 111Pd, the disposal unit 113d, the suction unit 106Sd, the mounting unit 114d, and the sensor 112d, so that redundant description will be omitted. In FIGS. 8 and 9, the discharging unit 111Pd, the disposal unit 113d, the suction unit 106Sd, the mounting unit 114d, and the sensor 112d respectively correspond to the discharging unit 111P, the disposal unit 113, the suction unit 106S, the mounting unit 114, and the sensor 112 of the first embodiment (FIG. 2), so that redundant description will be omitted.

The fifth embodiment is different from the embodiments described above. In the fifth embodiment, the discharging unit 111Pd, the disposal unit 113d, the suction unit 106Sd, and the mounting unit 114d are arranged along a straight line, and a specimen dispensing mechanism 107d moves a dispensing nozzle 1075 along the straight line. As shown in FIG. 9 as an example, in a movement mechanism including a movement rail 1073 and a block 1074 movable along the movement rail 1073, the dispensing nozzle 1075 can be attached to one end of the block 1074. Thereby, the dispensing nozzle 1075 can move along the straight-line movement path Rm. This is different from the embodiments described above where the dispensing nozzle is arcuately moved.

The automatic analysis apparatus of the fifth embodiment is provided with the sensor 112d that detects the presence or absence of mounting of the dispensing tip CP on the dispensing nozzle 1075 that moves lineally. Here, the sensor 112*d* includes a laser light source 112L that emits laser light along the movement path Rm and an optical sensor 112*d* arranged on an extended line of the movement path Rm. The laser light from the laser light source 112L is blocked when the dispensing tip CP is attached to the dispensing nozzle 1075. Thereby, the optical sensor 112*d* can detect the presence or absence of the mounting of the dispensing tip CP. The sensor 112*d* may be an image sensor arranged on the extended line of the movement path Rm instead of the laser light source and the optical sensor as shown in FIGS. 8 and 9.

The operation of the fifth embodiment can be performed similarly to the operations of the embodiments described above, so that its description is omitted here. An arrangement order of the discharging unit 111Pd, the disposal unit 113*d*, the suction unit 106Sd, and the mounting unit 114*d* can be arbitrarily changed.

[Others]

Figure 10A:
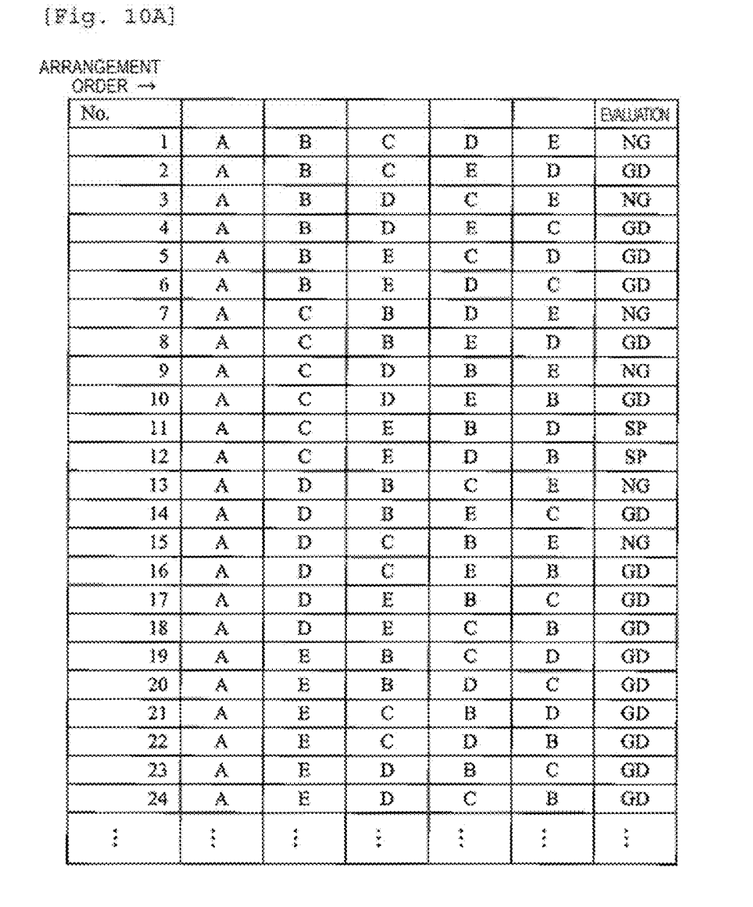
FIG. 10A is a diagram illustrating combinations each of which shows an arrangement order of a mounting unit 114, a suction unit 106S, a discharging unit 111P, a disposal unit 113, and a sensor 112, and evaluations thereof according to the first to fourth embodiments.
Figure 10B:
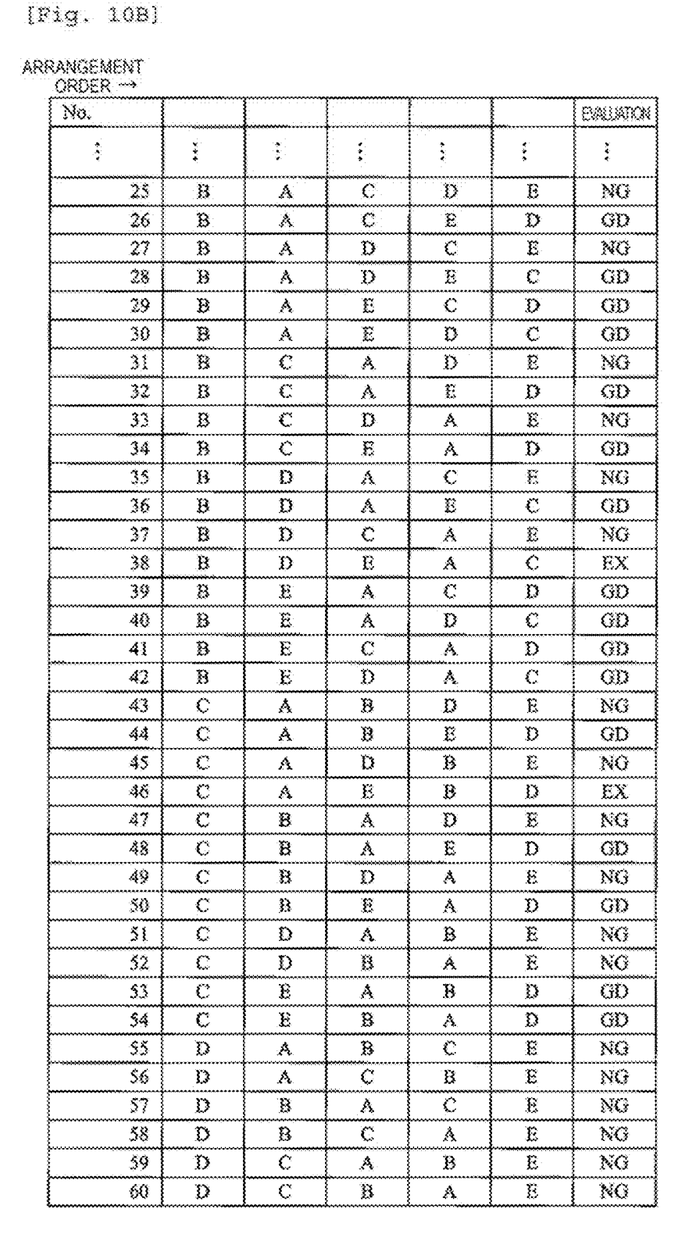
FIG. 10B is a diagram illustrating combinations each of which shows an arrangement order of the mounting unit 114, the suction unit 106S, the discharging unit 111P, the disposal unit 113, and the sensor 112, and evaluations thereof according to the first to fourth embodiments.
Figure 11:
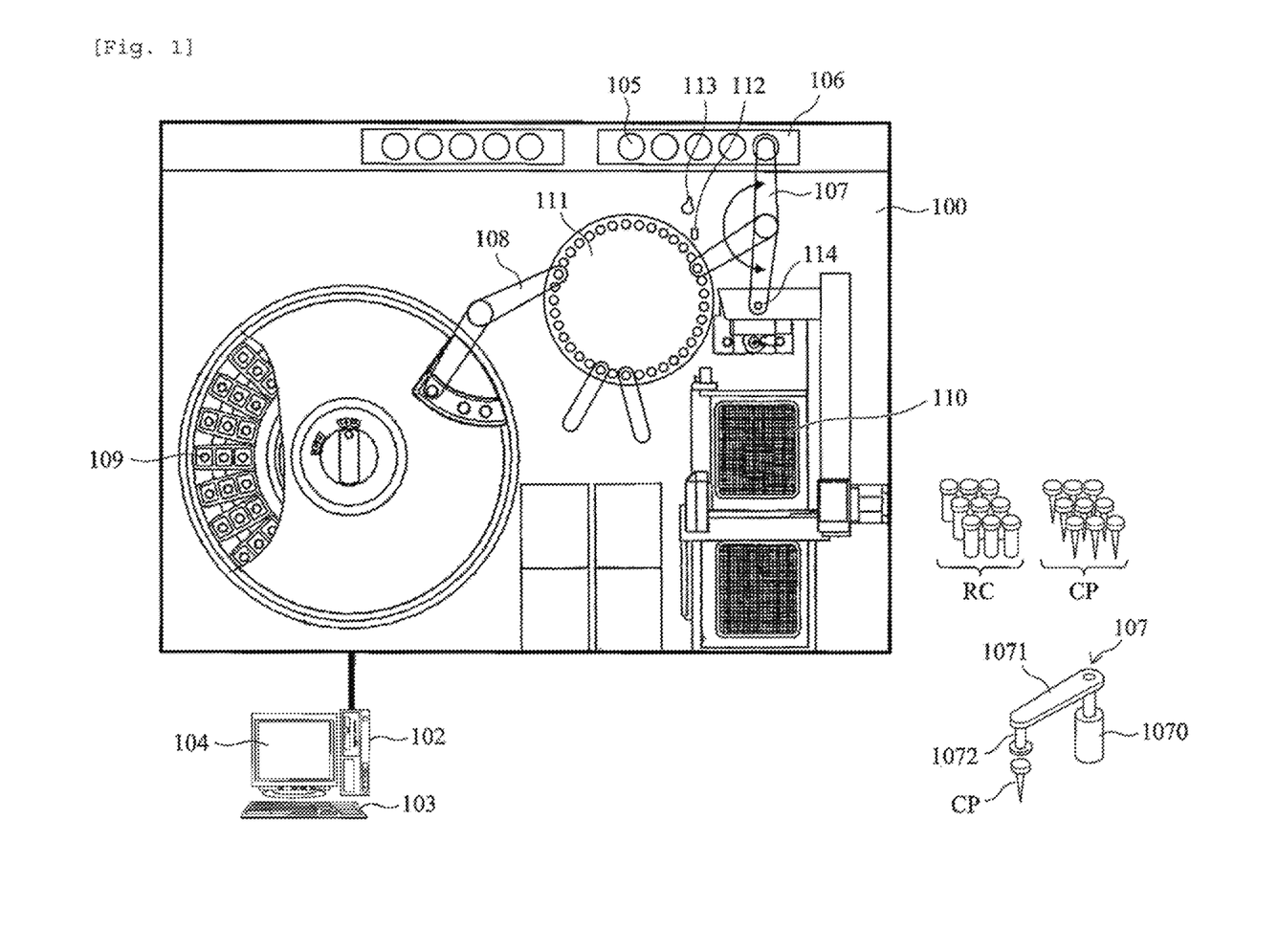

FIGS. 10A and 10B is a diagram illustrating combinations of the arrangement orders of the mounting unit 114, the suction unit 106S, the discharging unit 111P, the disposal unit 113, and the sensor 112 in the first to the fourth embodiments, and their evaluations (SP (superb) (best), EX (excellent) (better), GD (good) (good), or NG (no good) (poor)). In FIGS. 10A and 10B, A, B, C, D and E represent the mounting unit, the suction unit, the discharging unit, the disposal unit, and the sensor, respectively. For example, No. 1 shows an arrangement in which the mounting unit, the suction unit, the discharging unit, the disposal unit, and the sensor are arranged in this order from an end portion of the movement path. In FIGS. 10A and 10B, No. 12, No. 11, No. 38, and No. 46 represent the first embodiment, the second embodiment, the third embodiment, and the fourth embodiment, respectively. These can minimize useless movement of the specimen dispensing mechanism, so that their evaluations are SP (best) or EX (better). The first and the second embodiments are preferable in particular because the mounting unit cover is not required in these embodiments.

Figure 3:
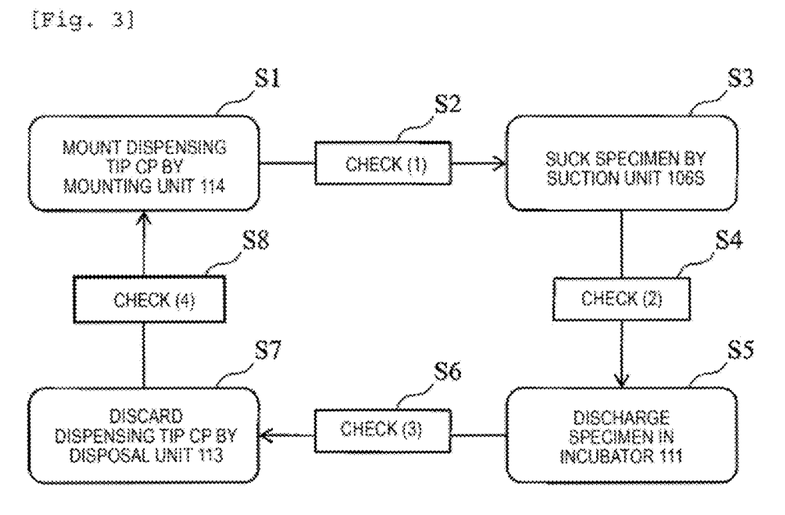
FIG. 3 is a flowchart illustrating an operation of the automatic analysis apparatus 100 according to the first embodiment.

Among 60 combinations shown in FIGS. 10A and 10B, combinations in which the sensor (E) is located at an end portion of the movement path Rm (for example, No. 1) have to move the specimen dispensing mechanism to the end portion of the movement path Rm every time step S1, S3, S5, or S7 in FIG. 3 is completed, so that high throughput cannot be obtained. Therefore, combinations in which the sensor (E) is located at the end portion of the movement path Rm are determined to be NG (poor). In the other combinations (sensor), the sensor (E) is arranged in a position between any two of the mounting unit (A), the suction unit (B), the discharging unit (C), and the disposal unit (D). In such arrangements, after steps S1, S3, S5, or S7 is completed, the specimen dispensing mechanism has to move (detour) to the sensor once or twice. However, as a whole, sufficiently high throughput can be obtained, so that the arrangements are determined to be GD (good).

While the embodiments of the present invention have been described, these embodiments are presented as examples and are not intended to limit the scope of the invention. These novel embodiments can be implemented in other various forms, and can be variously omitted, replaced, and changed without departing from the scope of the invention. These embodiments and their modifications are included in the scope and gist of the invention and are also included in the inventions described in the claims and their equivalents.

REFERENCE SIGNS LIST

100 automatic analysis apparatus
102 control unit
103 input unit
104 display unit
105 specimen vessel
106 specimen vessel rack
106 to 106Sd suction unit
107 to 107*d* specimen dispensing mechanism
108 reagent dispensing mechanism
109 reagent vessel
110 reaction vessel and dispensing tip accommodating unit
111 to 111*d* incubator
111P to 111Pd discharging unit
112*d* optical sensor
112L laser light source
112 to 112*d* sensor
113 to 113*d* disposal unit
114 to 114*d* mounting unit
115*b*, 115*c* mounting unit cover
1070 rotation shaft
1071 arm
1072, 1075 dispensing nozzle
1151 rotation shaft
1152 shielding plate
CP dispensing tip
RC reaction vessel
Rm movement path

The invention claimed is:

1. An automatic analysis apparatus, comprising:
an incubator which accommodates a plurality of reaction vessels;
a specimen dispensing mechanism which dispenses a specimen into each of the plurality of reaction vessels;
a mounting unit which mounts a dispensing tip on the specimen dispensing mechanism;
a suction unit which sucks a specimen from a specimen vessel containing the specimen by means of the specimen dispensing mechanism having the dispensing tip mounted thereon;
a discharging unit which is provided in the incubator and discharges the specimen from the specimen dispensing mechanism to the reaction vessel;
a disposal unit which discards the dispensing tip;
a sensor which detects whether the dispensing tip is mounted to the specimen dispensing mechanism; and
a control unit which controls the specimen dispensing mechanism,
wherein the mounting unit, the suction unit, the discharging unit, and the disposal unit are arranged along a movement path of the specimen dispensing mechanism
the sensor is arranged so as to be able to detect the dispensing tip at a position sandwiched between any two of the mounting unit, the suction unit, the discharging unit, and the disposal unit, and
the mounting unit and the discharging unit are arranged on one side of the movement path as viewed from a detection position of the sensor, and the suction unit and the disposal unit are arranged on the other side of the movement path.

2. The automatic analysis apparatus according to claim 1, wherein the mounting unit is arranged closer to an end portion of the movement path than the suction unit, the discharging unit, and the disposal unit.

3. The automatic analysis apparatus according to claim 1, wherein at least one of the suction unit, the discharging unit and the disposal unit is arranged at a position farther from an end portion of the movement path than the mounting unit, and the automatic analysis apparatus further comprises a mounting unit cover which covers the mounting unit.

4. The automatic analysis apparatus according to claim 1, further comprising:

a standby unit which allows the specimen dispensing mechanism to stand by, wherein the control unit moves the specimen dispensing mechanism from the standby unit to the mounting unit via the vicinity of the sensor in a case where a new dispensing instruction is issued.

* * * * *